United States Patent [19]

King et al.

[11] Patent Number: 4,563,412
[45] Date of Patent: Jan. 7, 1986

[54] BLACK IMAGE DYE-PROVIDING MATERIALS AND PHOTOGRAPHIC PRODUCTS AND PROCESSES UTILIZING SAME

[75] Inventors: Patrick F. King, No. Quincy; Stephen G. Stroud, Allston, both of Mass.

[73] Assignee: Polaroid Corporation, Cambridge, Mass.

[21] Appl. No.: 654,774

[22] Filed: Sep. 26, 1984

Related U.S. Application Data

[63] Continuation-in-part of Ser. No. 564,016, Dec. 21, 1983, abandoned.

[51] Int. Cl.$^4$ ............................ G03C 1/40; G03C 5/54
[52] U.S. Cl. ................................ 430/223; 430/222; 430/225; 430/226; 430/563
[58] Field of Search ............... 430/222, 223, 225, 226, 430/563

[56] References Cited

U.S. PATENT DOCUMENTS

| | | | |
|---|---|---|---|
| 1,918,938 | 7/1933 | Straub et al. | 260/145 B |
| 4,000,965 | 1/1977 | Mennicke et al. | 260/145 A |
| 4,085,097 | 4/1978 | Beffa et al. | 260/145 A |
| 4,174,221 | 11/1979 | Idelson | 430/225 |
| 4,358,527 | 11/1981 | Bailey et al. | 430/223 |
| 4,416,815 | 10/1983 | Schütz et al. | 260/145 |

FOREIGN PATENT DOCUMENTS

| | | | |
|---|---|---|---|
| 0243954 | 11/1959 | Australia | 534/696 |
| 565517 | 11/1958 | Canada | 534/696 |
| 2604799 | 8/1977 | Fed. Rep. of Germany | 260/145 B |

*Primary Examiner*—Richard L. Schilling
*Attorney, Agent, or Firm*—Gaetano D. Maccarone

[57] ABSTRACT

Diffusion transfer photographic color products and processes are described in which there are utilized novel chrome complexed neutral tone black image dye-providing materials which include either a 1-naphthol-2'-naphthol-1', 2-azo dye moiety or a 2-naphthol-2'naphthol-1, 1'-azo dye moiety, a parasubstituted phenyl azo-pyrazolone dye moiety and a cation. The image dye-providing material includes a diffusion control moiety such as a hydroquinonyl group or a precursor thereof and may be diffusible or nondiffusible as a function of the diffusion control moiety.

17 Claims, 2 Drawing Figures

BLACK IMAGE DYE-PROVIDING MATERIALS AND PHOTOGRAPHIC PRODUCTS AND PROCESSES UTILIZING SAME

CROSS-REFERENCE TO RELATED APPLICATION

This application is a continuation-in-part of prior copending application Ser. No. 564,016, filed Dec. 21, 1983 now abandoned.

Reference is made to copending, commonly assigned patent application Ser. No. 654,775 filed on even date herewith.

BACKGROUND OF THE INVENTION

This invention relates to photography in general and, more particularly, to novel image dye-providing materials which are useful for providing diffusion transfer images and to photographic products and processes utilizing such materials.

Black image dye-providing materials can be used in diffusion transfer photography to form black and white images. The use of such materials to form the image can provide a number of advantages over processes where the image is formed by silver including image stability and the tone of the image.

SUMMARY OF THE INVENTION

It is an object of this invention to provide novel compounds.

It is another object to provide image dye-providing materials which are useful in photography.

It is still another object to provide image dye-providing materials which include a diffusion control moiety and which are useful in diffusion transfer photographic applications.

It is a further object to provide dye developers which are useful in diffusion transfer photographic applications.

Still another object is to provide image dye-providing materials which are useful in dye release diffusion transfer processes.

Yet another object is to provide novel photographic products and processes.

A further object is to provide novel diffusion transfer photographic products and processes.

BRIEF SUMMARY OF THE INVENTION

These and other objects and advantages are accomplished in accordance with the invention by providing novel chrome—complexed neutral tone black image dye-providing materials which include a 1-naphthol-2'-naphthol-1',2-azo dye moiety or a 2-naphthol-2'-naphthol-1,1'-azo dye moiety, a para-substituted azopyrazolone dye moiety and a cation. These image dye-providing materials provide image dye having the chromophoric system represented by the formula

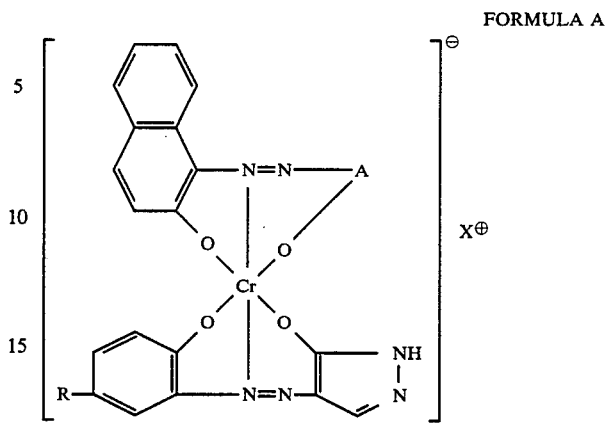

FORMULA A wherein A is a naphthyl residue attached to the nitrogen and oxygen atoms either as 1-azo-2-hydroxy or 1-hydroxy-2-azo; R may be hydrogen, $-NO_2$, $-SO_3H$ or $-SO_2NR_1R_2$; $R_1$ and $R_2$ may be the same or different and each may be hydrogen, alkyl, preferably having from 1 to 6 carbon atoms, aryl such as phenyl or alkyl or aryl substituted with a photographically useful group such as, for example, a diffusion control moiety as will be discussed in detail further below; and X is a cation.

It should be noted that the naphthyl moieties may be substituted on one or both of the fused rings with any photographically acceptable substituents including, for example, electron withdrawing groups such as cyano, acetyl, nitro, sulfone, sulfonamido, sulfonic acid, etc. and electron donating groups such as alkyl, methoxy, amino, etc. The pyrazolone moiety may also be substituted in any of the available positions with any photographically acceptable substituents. Appropriate substituents may also be attached to the available positions on the phenyl ring. In a preferred embodiment the image dye-providing materials of the invention provide image dyes within Formula A having the chromophoric system represented by the formula

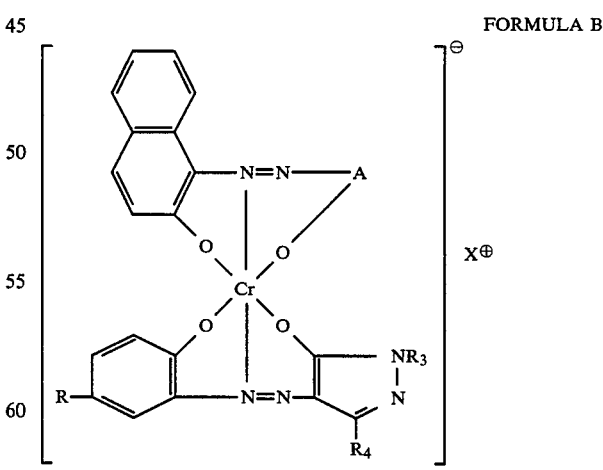

FORMULA B wherein $R_3$ and $R_4$ may be the same or different and each may be hydrogen, alkyl, preferably having from 1 to 6 carbon atoms, aryl such as phenyl or alkyl or aryl substituted with any photographically acceptable substituents such as those described above.

It has been found that images formed with the preferred image dye-providing materials of the invention exhibit very good light stability and the ability to fade evenly across the visible spectrum.

The image dye-providing materials of the invention include a diffusion transfer control moiety such as a hydroquinonyl group or a precursor thereof and may be diffusible or nondiffusible as a function of the diffusion control moiety.

In the photographic diffusion transfer processes of the invention the desired image is obtained by processing an exposed photosensitive silver halide material with a processing composition distributed between two sheet-like elements, one of said elements including said photosensitive material. The processing composition is so applied and confined within and between the two sheet-like elements as not to contact or wet outer surfaces of the superposed elements, thus providing a film unit or film packet whose outer surfaces are dry. The processing composition may be viscous or nonviscous and preferably is distributed from a single use container; such pressure rupturable processing composition containers are commonly referred to as "pods". The final image may be monochrome or multicolor and is formed in an image receiving layer included in one of said sheet-like elements.

As is well known in diffusion transfer photography the image dye-providing materials which may be utilized in such processing generally may be characterized as either (1) initially soluble or diffusible in the processing composition but which are selectively rendered nondiffusible imagewise as a function of development; or (2) initially insoluble or nondiffusible in the processing composition but which selectively provide a diffusible product imagewise as a function of development. The image dye-providing materials of the invention may be complete dyes or dye intermediates, e.g., couplers. The requisite differential in mobility or solubility may be obtained, for example, by a chemical reaction such as a redox reaction, a coupling reaction or a cleavage reaction.

The image dye-providing materials which are capable of providing image dyes including the chromophoric system of Formula A include a diffusion control substituent, Y, which substituent includes a diffusion control moiety, Z. One such group of image dye-providing materials according to the invention is represented by the formula

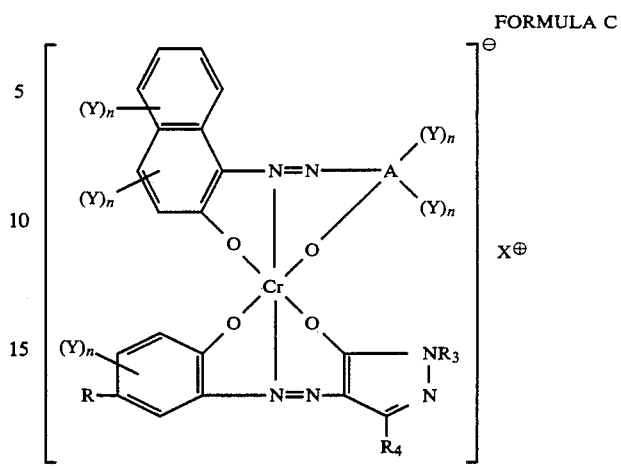

FORMULA C where $R_5$ and $R_6$ may be the same or different and each may be hydrogen, alkyl, preferably having from 1 to 6 carbon atoms, aryl such as phenyl, alkyl or aryl substituted with any photographically acceptable substituents such as those described above, or (Y) n, each Y is a substituent including at least one diffusion control moiety and each n is 0 or 1 provided that at least one n is 1.

Compounds within Formula C according to the invention are represented by the formulas

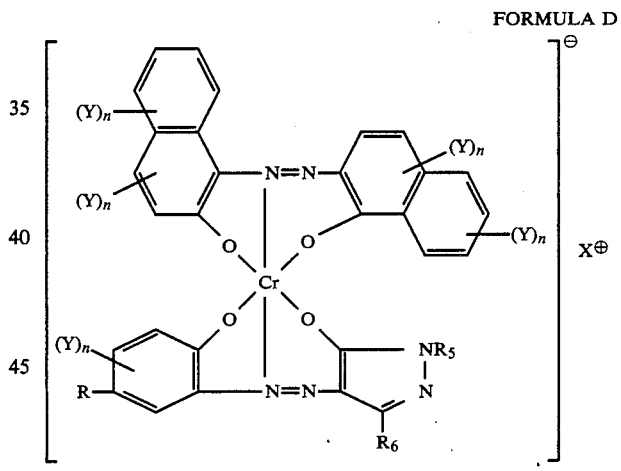

FORMULA D

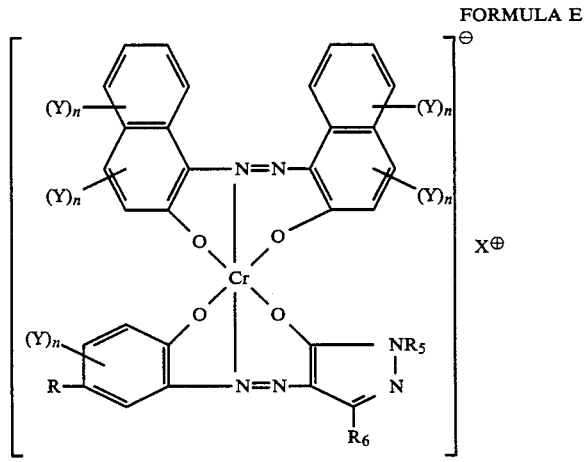

FORMULA E

It will be noted that Formula D illustrates a naphthyl residue, as designated by A in Formulas A-C, which is attached to the nitrogen and oxygen atoms in the 2-azo-1-hydroxy positions and Formula E illustrates a naphthyl residue atttached to the nitrogen and oxygen atoms in the 1-azo-2-hydroxy positions.

In such image dye-providing materials the diffusion control substituent, Y, may be represented by —E—Dev where Dev is a hydroquinonyl group or a precursor thereof and E is a covalent bond or a divalent linking group such as, for example, alkylene.

Image dye-providing materials within Formulas C, D and E, as a function of the particular diffusion control moiety, Z, which is present, are suitable for use in diffusion transfer processes employing either initially diffusible or initially nondiffusible image dye-providing materials. Typical suitable diffusion control moieties include, for example, hydroquinonyl groups, coupling groups, sulfonamido phenol groups which cleave or ring close following oxidation to release a diffusible dye or dye intermediate, thiazolidine groups whose cleavage is silver catalyzed, and others such as those disclosed in Dye Diffusion Systems in Color Photography, Van de Sande, Angew. Chem. Int. Ed. Engl. 22 (1983), pp 191-209.

The diffusion control moiety, Z, may be attached by a covalent bond or a divalent organic radical, for example, an alkylene radical to complete the diffusion control substituent Y. Further where the image dye-providing material is initially diffusible a suitable ballast group, for example, a long chain alkyl group, may be attached to the diffusion control moiety.

BRIEF DESCRIPTION OF THE DRAWING

For a better understanding of the invention as well as other objects and further features thereof, reference is made to the following detailed description of various preferred embodiments thereof taken in conjunction with the accompanying drawing wherein.

DESCRIPTION OF THE PREFERRED EMBODIMENTS

Preferred dye developers according to the invention are represented by the formulas

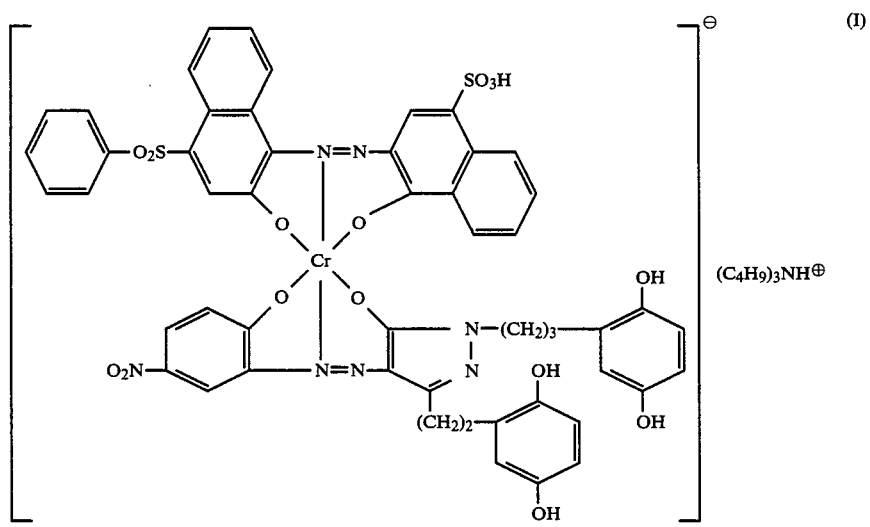

-continued
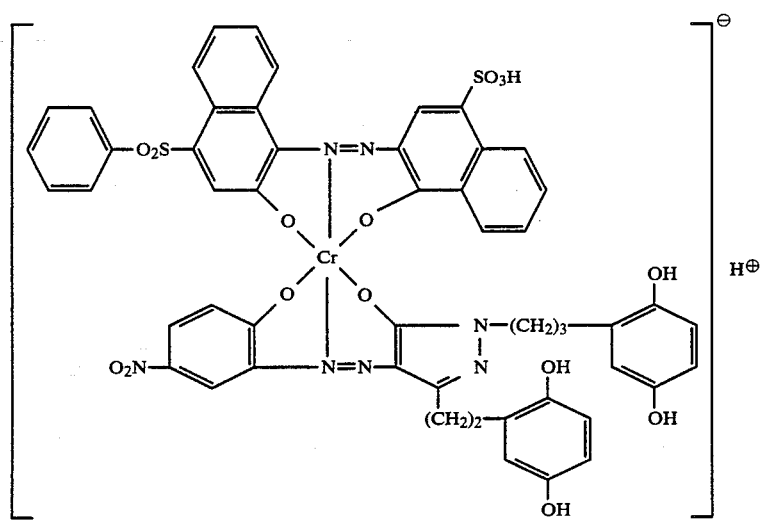
(II)
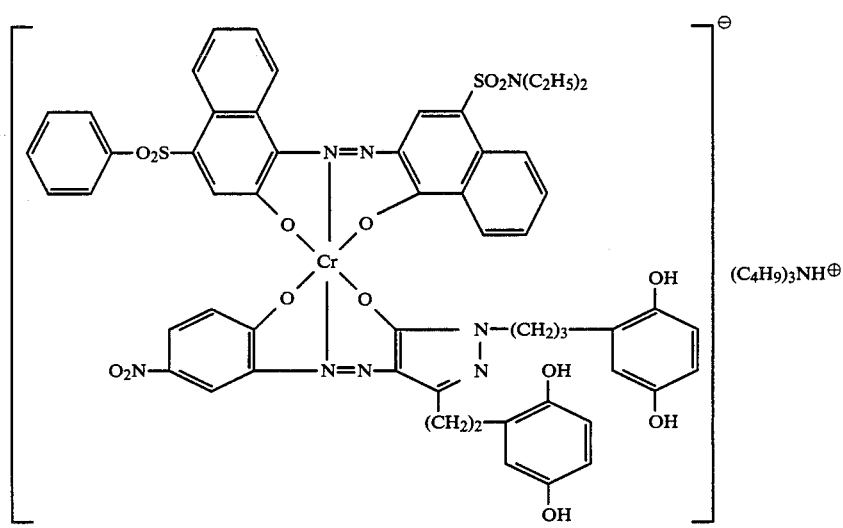
(III)
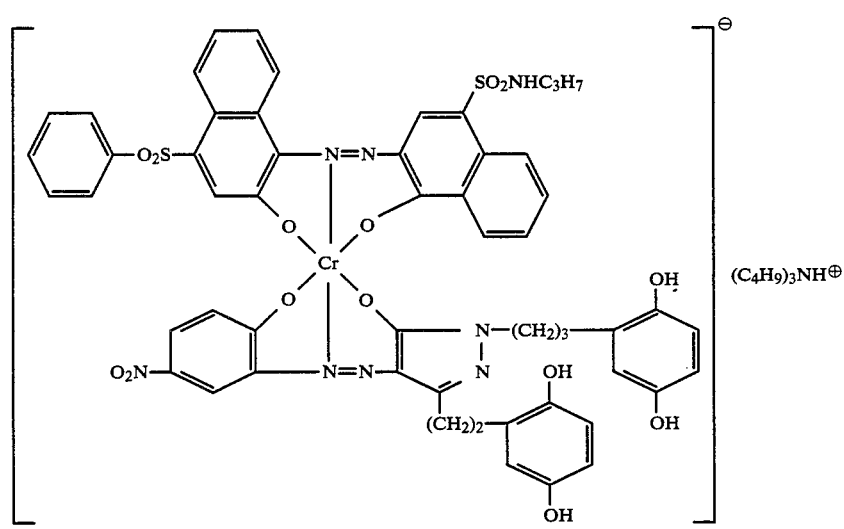
(IV)

-continued

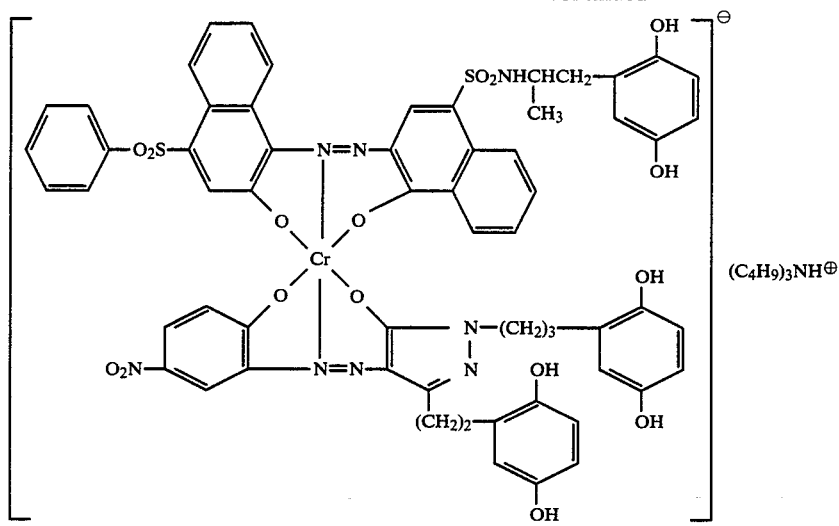

(V)

(C$_4$H$_9$)$_3$NH$^{\oplus}$

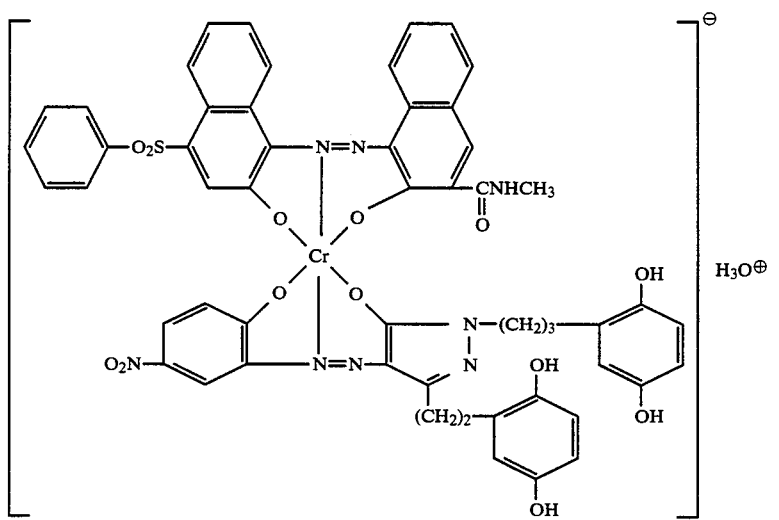

(VI)

H$_3$O$^{\oplus}$

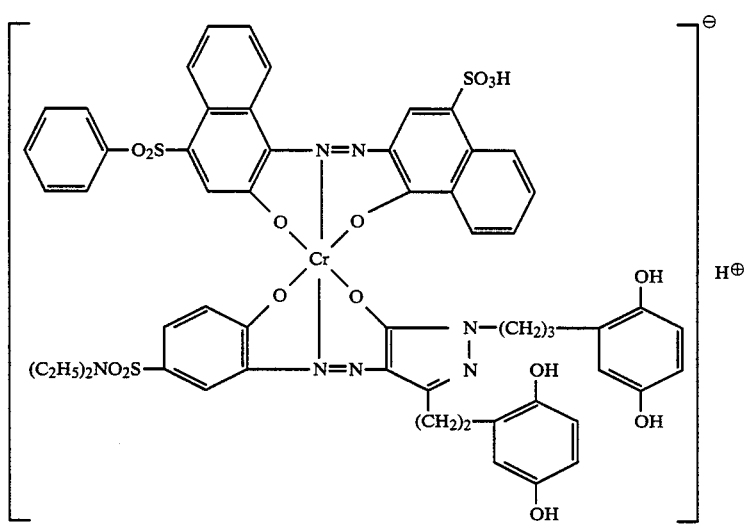

(VII)

H$^{\oplus}$

The image dye-providing materials can be prepared according to techniques which are well known to those skilled in the art as will be apparent from the specific preparative examples which are provided below herein. Accordingly, extensive discussion relating to the preparation of the compounds of the invention is not necessary. Generally, it is preferred to attach the chromium atom to the para-substituted phenyl azo pyrazolone dye moiety first and subsequenly attach the 1-naphthol-2'-naphthol-1',2-azo dye moiety or the 2-naphthol-2'-naphthol-1,1'-azo dye moiety.

Figure 1:
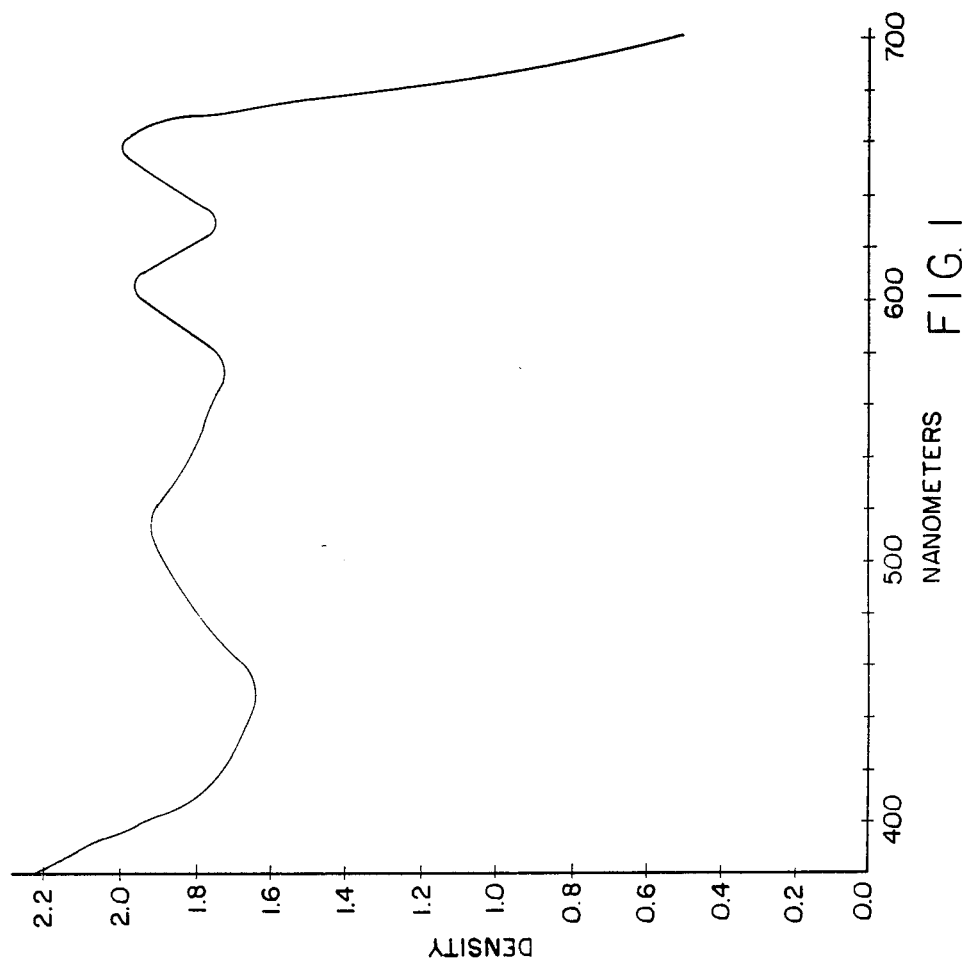
FIG. 1 shows the reflection absorption spectrum of one of the preferred image dye-providing materials of the invention.

The black image dye-providing materials of the invention typically absorb almost evenly across the visible spectrum as is illustrated by FIG. 1 which is the reflection absorption spectrum of a photographic image made with a film unit including Compound I.

The image dye-providing materials of the invention may be used generally in association with any silver halide emulsion. As mentioned previously, the image dye-providing materials may be characterized as either (1) initially soluble or diffusible in the processing composition but which are selectively rendered nondiffusible imagewise as a function of development; or (2) initially insoluble or nondiffusible in the processing composition but which selectively provide a diffusible product imagewise as a function of development. The image dye-providing materials may be complete dyes or dye intermediates, e.g., color couplers. The requisite differential in mobility or solubility may be obtained, for example, by a chemical reaction such as a redox reaction, coupling reaction or a cleavage reaction. In a particularly preferred embodiment of the invention, the image dye-providing materials are dye developers which are initially diffusible materials. The dye developers contain, in the same molecule, both the chromophoric system of a dye and a silver halide developing function as is described in U.S. Pat. No. 2,983,606. Other image dye-providing materials of the invention are: initially diffusible coupling dyes such as are useful in the diffusion transfer process described in U.S. Pat. No. 3,087,817 and which are rendered nondiffusible by coupling with the oxidation product of a color developer; initially nondiffusible dyes which release a diffusible dye following oxidation, sometimes referred to as "redox dye releaser" dyes, such as described in U.S. Pat. Nos. 3,725,062 and 4,076,529; initially nondiffusible image dye-providing materials which release a diffusible dye following oxidation and intramolecular ring closure as are described in U.S. Pat. No. 3,443,940 or undergo silver assisted cleavage to release a diffusible dye in accordance with the disclosure of U.S. Pat. No. 3,719,489; and initially nondiffusible image dye-providing materials which release a diffusible dye following coupling with an oxidized color developer as described in U.S. Pat. No. 3,227,550.

The diffusion transfer film units of the invention include those wherein the image receiving element is designed to be separated from the photosensitive element after processing and integral positive-negative diffusion transfer film units which are retained intact after processing. In a preferred embodiment the diffusion transfer film units of the invention utilize initially diffusible dye developers as the image dye-providing materials. As described in U.S. Pat. No. 2,983,606, a photosensitive element containing a dye developer and a silver halide emulsion is photoexposed and a processing composition applied thereto, for example, by immersion, coating, spraying, flowing, etc., in the dark. The exposed photosensitive element is superposed prior to, during, or after the processing composition is applied, on a sheet-like support element which may be utilized as an image-receiving element. In a preferred embodiment, the processing composition is applied to the exposed photosensitive element in a substantially uniform layer as the photosensitive element is brought into superposed relationship with the image-receiving layer. The processing composition, positioned intermediate the photosensitive element and the image-receiving layer, permeates the emulsion to initiate development of the latent image contained therein. The dye developer is immobilized or precipitated in exposed areas as a consequence of the development of the latent image. This immobilization is apparently, at least in part, due to a change in the solubility characteristics of the dye developer upon oxidation and especially as regards its solubility in alkaline solutions. It may also be due in part to a tanning effect on the emulsion by oxidized developing agent, and in part to a localized exhaustion of alkali as a result of development. In unexposed and partially exposed areas of the emulsion, the dye developer is unreacted and diffusible and thus provides an imagewise distribution of unoxidized dye developer, diffusible in the processing composition, as a function of the point-to-point degree of exposure of the silver halide emulsion. At least part of this imagewise distribution of unoxidized dye developer is transferred, by imbibition, to a superposed image-receiving layer or element, said transfer substantially excluding oxidized dye developer. The image-receiving layer receives a depthwise diffusion, from the developed emulsion, of unoxidized dye developer without appreciably disturbing the imagewise distribution thereof to provide a reversed or positive color image of the developed image. The image-receiving element may contain agents adapted to mordant or otherwise fix the diffused, unoxidized dye developer. In a preferred embodiment of said U.S. Pat. No. 2,983,606 and in certain commercial applications thereof, the desired positive image is revealed by separating the image-receiving layer from the photosensitive element at the end of the suitable imbibition period. Alternatively, as also disclosed in said U.S. Pat. No. 2,983,606, the image-receiving layer need not be separated from its superposed contact with the photosensitive element, subsequent to transfer image formation, if the support for the image-receiving layer, as well as any other layers intermediate said support and image-receiving layer, is transparent and a processing composition containing a substance, e.g., a white pigment, effective to mask the developed silver halide emulsion or emulsions is applied between the image-receiving layer and said silver halide emulsion or emulsions.

Dye developers, as noted in said U.S. Pat. No. 2,983,606, are compounds which contain, in the same molecule, both the chromophoric system of a dye and also a silver halide developing function. By "a silver halide developing function" is meant a grouping adapted to develop exposed silver halide. A preferred silver halide development function is a hydroquinonyl group. In general, the development function includes a benzonoid developing function, that is, an aromatic developing group which forms quinonoid or quinone substances when oxidized.

Particularly useful products for providing dye developer images are disclosed in U.S. Pat. No. 3,415,644. This patent discloses photographic products wherein a photosensitive element and an image-receiving element are maintained in fixed relationship prior to exposure, and this relationship is maintained as a laminate after processing and image formation. In these products, the final image is viewed through a transparent (support) element against a light-reflecting, i.e., white background. Photoexposure is made through said transparent element and application of the processing composition provides a layer of light-reflecting material to provide a white background. The light-reflecting material (referred to in said patent as an "opacifying agent") is preferably titanium dioxide, and it also performs an opacifying function, i.e., it is effective to mask the developed silver halide emulsions so that the transfer image may be viewed without interference therefrom, and it also acts to protect the photoexposed silver halide emulsions from postexposure fogging by light passing through said transparent layer if the photoexposed film unit is removed from the camera before image-formation is completed.

U.S. Pat. No. 3,647,437 is concerned with improvements in products and processes disclosed in said U.S. Pat. No. 3,415,644, and discloses the provision of light-absorbing materials to permit such processes to be performed, outside of the camera in which photoexposure is effected, under much more intense ambient light conditions. A light-absorbing material or reagent, preferably a pH-sensitive phthalein dye, is provided so positioned and/or constituted as not to interfere with photoexposure but so positioned between the photoexposed silver halide emulsions and the transparent support during processing after photoexposure as to absorb light which otherwise might fog the photoexposed emulsions. Furthermore, the light-absorbing material is so positioned and/or consitituted after processing as not to interfere with viewing the desired image shortly after said image has been formed. In the preferred embodiments, the light-absorbing material, also sometimes referred to as an optical filter agent, is initially contained in the processing composition together with a light-reflecting material, e.g., titanium dioxide. The concentration of the light-absorbing dye is selected to provide the light transmission opacity required to perform the particular process under the selected light conditions.

In a particularly useful embodiment, the light-absorbing dye is highly colored at the pH of the processing composition, e.g., 13–14, but is substantially nonabsorbing of visible light at a lower pH, e.g., less than 10–12. This pH reduction may be effected by an acid-reacting reagent appropriately positioned in the film unit, e.g., in a layer between the transparent support and the image-receiving layer.

The dye developers may be incorporated in the silver halide emulsion or, preferably, in a separate layer behind the silver halide emulsion. Such dye developer layer may be applied by use of a coating solution containing the dye developer, in a concentration calculated to give the desired coverage of dye developer per unit area, in a film-forming natural or synthetic polymer such as, for example, gelatin, polyvinyl alcohol and the like, adapted to be permeated by the processing composition.

Other diffusion transfer products and processes according to the invention are the types described in U.S. Pat. Nos. 3,573,043 and 3,594,165. For convenience the entire disclosure of each of the five patents referred to immediately above is hereby incorporated by reference herein.

As described previously, the image dye-providing materials of the invention are not restricted to dye developers but rather may include many other types of initially diffusible and initially nondiffusible image dye-providing materials. Thus, for example, an initially diffusible coupling dye which is useful in the diffusion transfer process described in U.S. Pat. No. 3,087,817 may be provided by attaching to the chromophoric system one or more coupling moieties such as a phenol or a naphthol having a free position para to the hydroxyl group. An example of such an image dye-providing material according to the invention is

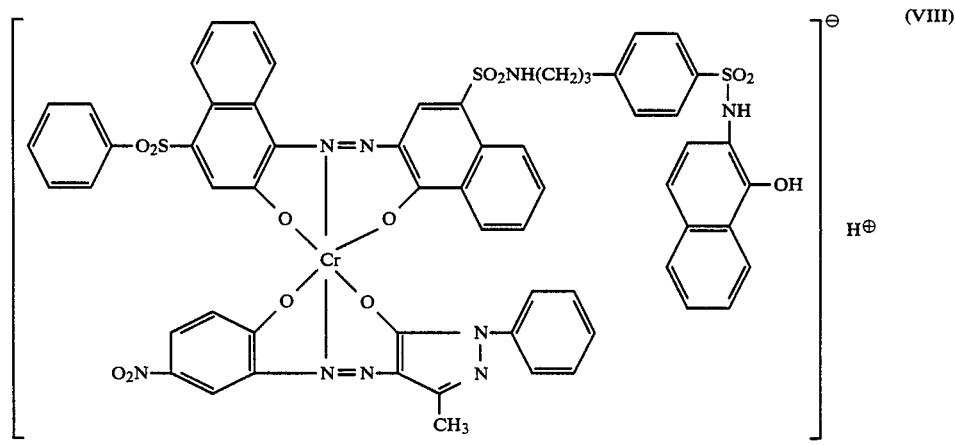

This dye is initially diffusible but is rendered nondiffusible by coupling with the oxidation product of a color developer, e.g., a p-phenylenediamine or a p-aminophenol, to form a less diffusible product. If the coupling position is substituted by a substituent which renders the dye initially nondiffusible by virtue of a ballast group and which substituent is displaceable upon coupling, such a dye may be employed to provide a diffusible dye where coupling occurs employing the principles described in U.S. Pat. No. 3,227,550.

An initially nondiffusible "redox dye releaser" image dye-providing material useful in the diffusion transfer process described in U.S. Pat. No. 4,076,529 may be provided by attaching one or more sulfonamidophenol or sulfonamidonaphthol groups to the chromophoric system. An example of such a material according to the invention is represented by the formula

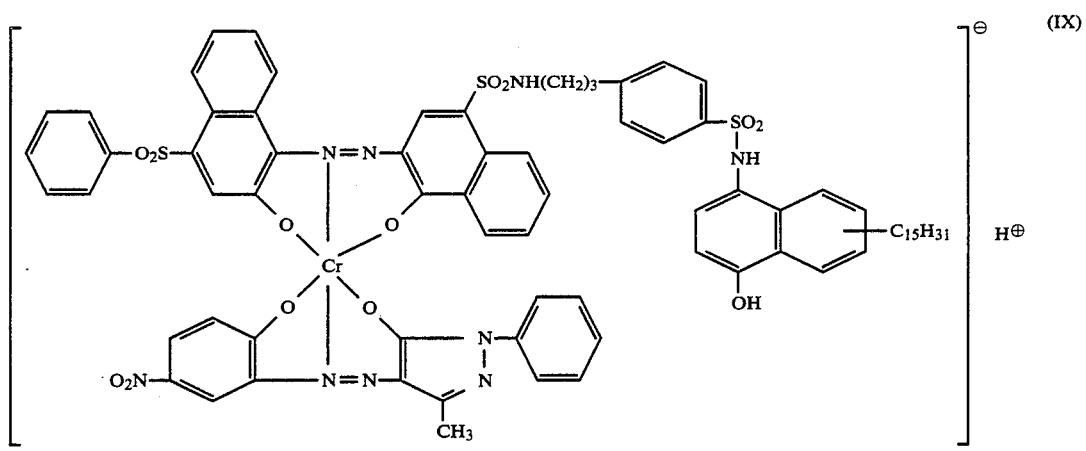

Other sulfonamidophenol and sulfonamidonaphthol groups known in the art, for example, such as those described in U.S. Pat. Nos. 4,053,312 and 4,055,428, which cleave in alkaline solution at the sulfonamido groups following oxidation may be used in place of the p-sulfonamidophenol group illustrated above.

Another class of initially nondiffusible image dye-providing materials (described in U.S. Pat. No. 3,443,940) release a diffusible dye following oxidation and intramolecular ring closure. An image dye-providing material of this type according to the invention is represented by the formula

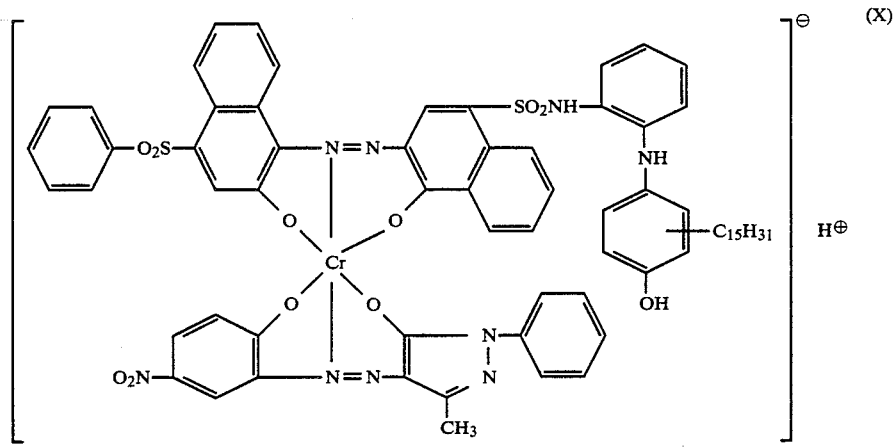

Other image dye-providing materials which cleave in alkali following oxidation may be provided by a compound within Formula D or E wherein Y is —O— or —S— and the hydroquinonyl group contains a ballast group, e.g., $C_{15}H_{31}$ in accordance with the disclosure of U.S. Pat. No. 3,725,062. An example of such a compound is represented by the formula

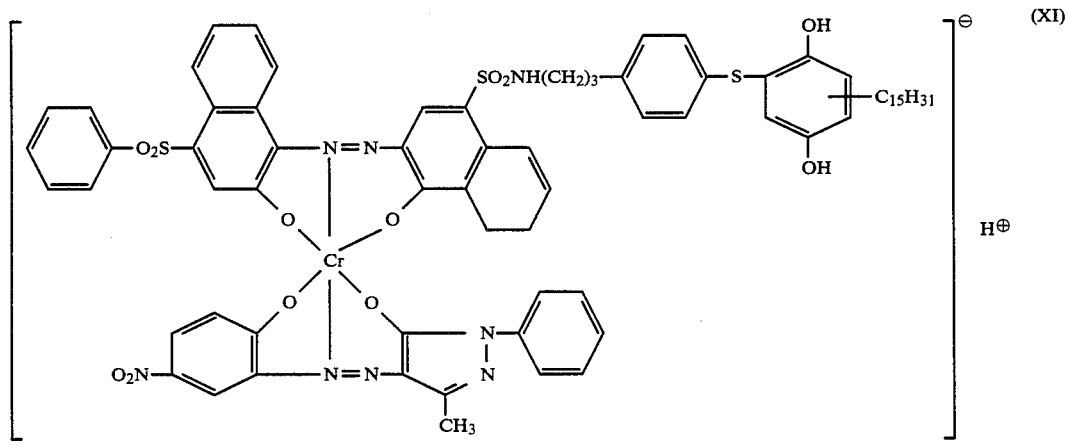

It should be noted that although the ballast group shown in the compounds illustrated above is a long chain alkyl group, other ballast groups known in the art may also be used.

In the use of a nondiffusible image dye-providing material which releases a diffusible image dye-providing material following oxidation in an alkaline environment, the requisite oxidation may be effected by the oxidation product of a mobile developing agent used to develop the photoexposed silver halide emulsion. A particularly effective developing agent for this purpose is 1-phenyl-4,4-dimethyl-3-pyrazolidone; other suitable developing agents are known in the art.

Development is advantageously effected in the presence of an onium compound, particularly a quaternary ammonium compound, in accordance with the disclosure of U.S. Pat. No. 3,173,786. Quaternary ammonium compounds which form an active methylene compound in alkali are especially useful.

Development may be effected in the presence of a colorless auxiliary or accelerating developing agent such as, for example, a 3-pyrazolidone or a hydroquinone such as 4-methylphenylhydroquinone, which may be initially arranged in a layer of the photosensitive element or in the processing composition.

In another preferred embodiment of the invention the diffusion control moiety is a thiazolidine group whose cleavage is silver catalyzed. As described in U.S. Pat. No. 3,719,489, image dye-providing materials of this type are photographically inert in the photographic processing composition but are capable of undergoing cleavage in the presence of an imagewise distribution of silver ions and/or soluble silver complex containing silver ions made available as a function of development to liberate a reagent in an imagewise distribution corresponding to that of said silver ions and/or said complex. An example of such a compound according to the invention is represented by the formula to be illustrative only and the invention is not limited to the materials, conditions, process parameters, etc., recited herein. All parts and percentages are by weight unless otherwise specified.

EXAMPLE I

To a stirred mixture of 4-nitro-2-aminophenol (30.8 g, 0.2 mol.) in 400 ml of acetic acid at 10° C. there was added dropwise, over 20 minutes, a solution of sodium nitrite (13.8 g, 0.2 mol.) in 30 ml of water. Stirring was continued for an additional 15 minutes. The resulting diazonium solution was then added in portions at 10° C. to a stirred solution of 146 g (0.2 mol.) of a pyrazolone compound represented by the formula

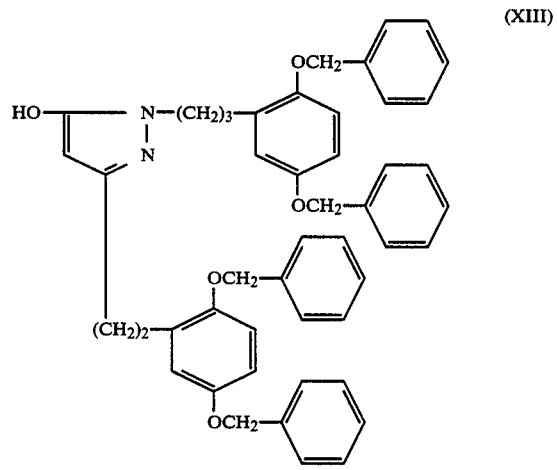

(XIII)

in 600 ml of pyridine. The resulting solution was stirred for one-half hour and then quenched into a stirred solution of four gallons of ice water containing 600 ml of concentrated hydrochloric acid. The solid was col-

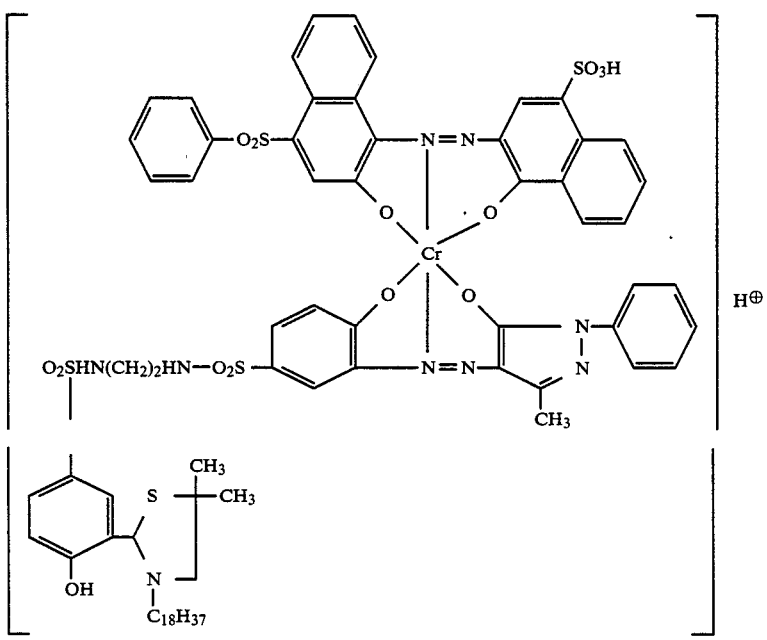

(XII)

The invention will now be described further in detail with respect to specific preferred embodiments by way of examples, it being understood that these are intended lected by filtration, rinsed well with water, pressed and dried. Recrystallization from two liters of acetonitrile yielded 160 g (90% yield) of a light orange dye, Vis(meth. cell.) λ max 410 nm, ε=13,200, 513 nm, ε=6,200, represented by the formula

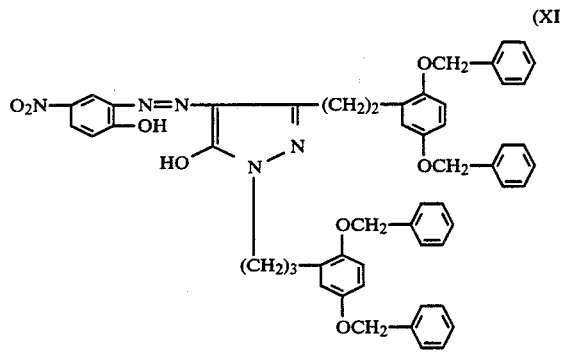
(XIV)

$C_{54}H_{49}N_5O_8$ requires 72.4% C, 5.47% H, 7.82% N and 14.3% O. Elemental analysis found 72.8% C, 5.7% H, 7.95% N and 14.25% O.

To a solution of compound XIV (15 g, 0.0167 mol.) in one liter of methylene chloride, under argon at ambient temperature, there were added, with stirring, boron trifluoride etherate (2.4 g, 0.17 mol.) and 2-bromo-1,3,2-benzodioxaborole (34 g, 0.17 mol.) and stirring was continued for 12 hours. The reaction mixture was quenched into a 2 phase dispersion of water (2 liters) and petroleum ether (500 ml) with rapid stirring. The product separated as a solid and was collected by filtration. Recrystallization from acetonitrile yielded 8.0 g (90% yield) of a yellow dye developer represented by the formula

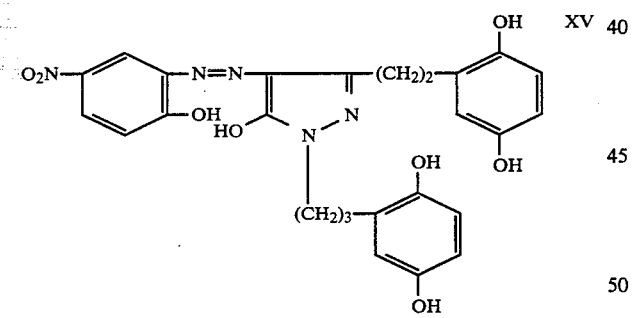
XV

Vis (meth. cell.) λ max=410 nm, ε=14,700.

$C_{26}H_{25}O_8N_5$ requires 54.64% C, 5.11% H and 12.25% N. Elemental analysis found 54.89% C, 5.0% H and 12.92% N.

Compound XV (5 g, 0.009 mol.) and chromic chloride hexahydrate (7.5 g, 0.028 mol.) were combined in 75 ml of methyl cellosolve under nitrogen and heated to reflux for two hours. The cooled solution was quenched into 500 ml of saline solution. The resulting solid was collected by filtration, rinsed with cold 50% brine and then with water and dried under vacuum to yield 5.3 g of a brown solid, Vis (meth. cell.) λ max 490 nm, ε=14,800, 520 nm, ε=10,400, represented by the formula

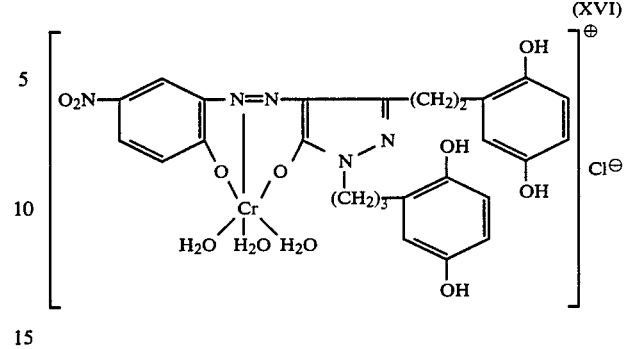
(XVI)

EXAMPLE II

A five liter, three neck round bottom flask equipped with an overhead stirrer was charged with 80 g (0.26 mol.) of an azo oxide compound represented by the formula

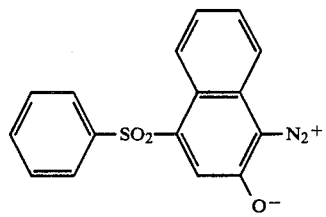

one liter of pyridine and two liters of ethanol followed by 1-naphthol-4-sulfonic acid sodium salt (100 g, 0.41 mol.), 600 ml of water and 600 ml of saturated sodium bicarbonate solution. The slurry was stirred at ambient temperature for 48 hours. Analysis by thin layer chromatography indicated complete reaction. The reaction mixture was quenched into 4 gallons of ice water which included 1 liter of concentrated hydrochloric acid. The resulting solid was collected by filtration, rinsed with water and dried in air to give 100 g (78% yield) of an azo dye represented by the formula

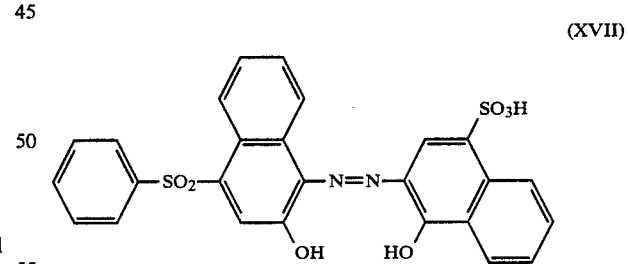
(XVII)

Vis (meth. cell.) λ max 530 nm, ε=11,400.

EXAMPLE III

Compound XVI (2 g, 0.0029 mol.) and Compound XVII (1.5 g, 0.0029 mol.) were combined in 50 ml of methyl cellosolve with tributylamine (1.09 g, 0.0059 mol.) and warmed on a steam cone for one hour. The reaction mixture was quenched into cold 10% hydrochloric acid and the resulting solid collected, rinsed and dried to give 3 g (79% yield) of black dye developer I, Vis (meth. cell.) λ max 650 nm, ε=22,800; 598 nm, ε=21,200; 505 nm, ε=20,200.

EXAMPLE IV

Compound II was prepared in the same manner described in Example III with the exception that potassium acetate was used as a base instead of tributylamine. Vis (meth. cell.) λ max 653 nm, ε=19,200; 600 nm, ε=18,000, 500 nm, ε=17,600.

EXAMPLE V

Compound III was prepared in the same manner described in Example III with the exception that an azo diethylsulfonamide dye compound was employed in place of the azo sulfonic acid dye. The reaction gave 1.85 g of black dye developer III (97% yield), Vis (meth. cell.) 500 nm, ε=23,000; 590 nm, ε=22,000; 641 nm, ε=23,000.

$C_{68}H_{78}O_{15}N_9S_2Cr$ requires 59.2% C, 5.8% H, 17.4% O, 9.1% N, 4.6% S and 3.8% Cr. Elemental analysis found 59.1% C, 5.5% H, 17.9% O, 8.8% N, 4.6% S and 3.8% Cr.

EXAMPLE VI

Compound IV was prepared in the manner described in Example V with the exception that an appropriately substituted propylamine was used instead of diethylamine in the preparation of the dye.

EXAMPLE VII

Compound V was prepared in the manner described in Example V with the exception that

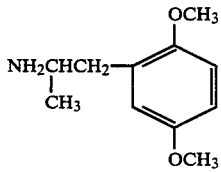

was used instead of diethylamine to form the dye and the methyl ether groups were converted to hydroxy groups by reaction with 2-bromo-1,3,2-benzodioxaborole prior to forming the complete dye developer, Compound V. Vis (meth. cell.) λ max 622 nm, ε=16,000, 580 nm, ε=17,900, 504 nm, ε=18,000.

EXAMPLE VIII

Exactly 10.1 g (0.05 mol.) of 3-hydroxy-2-naphthalene carboxylic acid methyl ester and 100 ml of methylamine (40% solution in water) were combined in a flask and refluxed for two hours. The solution was cooled to room temperature and stirred overnight. The reaction solution was quenched into a stirred solution of 1500 ml of ice water and 75 ml of conc. hydrochloric acid. The resulting yellow precipitate was collected by filtration, washed well with water and dried in air. The crude product was recrystallized from 300 ml of toluene to give 8.8 g (88% yield) of product, light yellow crystals, represented by the formula

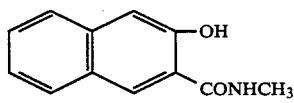

The previous product (1.0 g, 0.005 mol.), the azo oxide utilized in Example II (1.55 g, 0.005 mol.) and 75 ml of acetone were combined in a flask and stirred under nitrogen while being cooled in an ice bath. To the mixture there was added with stirring, 5 ml of a 50% (w/v) solution of NaOH. The reaction vessel was removed from the ice bath and stirring under nitrogen was continued as the reaction mixture warmed. The mixture slowly turned greenish, then deep blue and finally deep purple. The solution was stirred for an additional 1½ hours and then quenched into a solution of 300 ml of ice water and 10 ml of conc. hydrochloric acid. The resulting purple precipitate-water mixture was stirred overnight. The precipitate was collected by filtration, washed with water and about one liter of a 7:3 solution of methanol in water and dried in air overnight to give 1.4 g (55% yield) of a purple powder represented by the formula

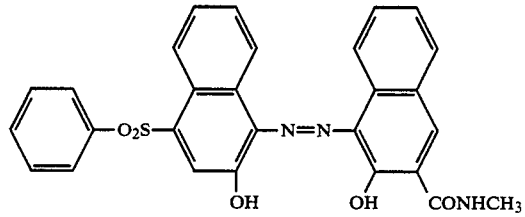

(XVIII)

A solution of compound XVI (1.3 g, 0.0019 mol.) in 35 ml of ethanol was formed and to it there were added with stirring, potassium acetate (0.6 g, 0.006 mol.) and then Compound XVIII (1.0 g, 0.002 mol.). The mixture was then brought to reflux under nitrogen and quickly turned black. After 5 minutes an additional 0.1 g of Compound XVIII was added to the reaction mixture which was then refluxed an additional 15 minutes. The reaction mixture was quenched into a solution of 100 ml of water, 50 ml of saline and 5 ml of conc. hydrochloric acid. The resulting black precipitate was collected by filtration, washed well with 100 ml of water and dried under vacuum to give 1.6 g (74% yield) of a black powder, dye developer VI, Vis (meth. cell.) λ max 648 nm, ε=16,500; 595 nm, ε=15,400; 498 nm, ε=17,000; 390 nm, ε=17,200.

EXAMPLE IX

A film unit according to the invention was prepared wherein the negative element comprised a transparent subcoated polyester photographic film base having the following layers coated thereon in succession:

1. a dye developer layer comprising about 70 mg./ft.$^2$ (753 mg./m.$^2$) of Compound (I) and about 50 mgs./ft.$^2$ (538 mgs./m.$^2$ of cellulose acetate hydrogen phthalate;

2. a blue sensitive silver iodobromide emulsion layer coated at a coverage of about 200 mgs./ft.$^2$ (1614 mgs./m.$^2$) of silver (1.6 microns) and about 96 mg./ft.$^2$ (1033 mgs./m.$^2$) of gelatin; and 3. a layer comprising about 7.5 mgs./ft.$^2$ (81 mgs./m.$^2$) of 4'-methyl (phenyl hydroquinone, about 30 mgs./ft.$^2$ (323 mgs./m.$^2$) of gelatin and about 15 mgs./ft.$^2$ (162 mgs./m.$^2$) of diethyldodecamide;

The image receiving element comprised a transparent subcoated polyethylene terephthalate photographic film base on which there were coated the following layers in succession:

1. as a polymeric acid layer approximately 9 parts of a ½ butyl ester of polyethylene/maleic anhydride copolymer and 1 part of polyvinyl butyral coated at a coverage of about 2450 mg./ft.$^2$ (26,372 mgs./m.$^2$);

2. a timing layer containing about 300 mg./ft.$^2$ (3229 mgs./m.$^2$) of a 60—29—6—4—0.4 pentapolymer of butylacrylate, diacetone acrylamide, methacrylic acid, styrene and acrylic acid and including about 5% polyvinyl alcohol; and 3. a polymeric image receiving layer of (a) 3 parts of a mixture of 2 parts polyvinyl alcohol and 1 part poly-4-vinylpyridine and (b) 1 part of a graft copolymer comprised of 4-vinylpyridine (4VP) and vinyl benzyl trimethyl ammonium chloride (TMQ) grafted onto hydroxyethyl cellulose (HEC) at a ratio of HEC/4VP/TMQ of 2.2/2.2/1 coated at a coverage of about 300 mg./ft.$^2$ (3229 mg./m.$^2$).

The film unit was processed with a processing composition comprised of

|  | WEIGHT PERCENT |
| --- | --- |
| Sodium hydroxide | 5.0 |
| Titanium dioxide | 50.0 |
| Phenylmercaptotetrazole | 0.1 |
| 6-methyl uracil | 0.5 |
| Carboxymethyl hydroxyethyl cellulose | 3.0 |
| Water to make 100% | |

The negative was exposed (2 meter-candle-seconds) on a sensitometer to a test exposure scale using a xenon light source and then processed by passing the negative together with the image receiving element through a pair of rollers set at a gap spacing of 0.0020 inch. The film unit was kept intact in the dark for 10 minutes. A well developed dye image was obtained. The neutral density column of the image was read on a densitometer to obtain the Dmax and Dmin values for red, green and blue light respectively.

|  | R | G | B |
| --- | --- | --- | --- |
| Dmax | 1.27 | 1.30 | 1.24 |
| Dmin | 0.37 | 0.38 | 0.37 |

The reflection spectrum illustrated in FIG. 1 was obtained from an image made using a film unit identical to that described above with the exception that layer 2 of the negative had about 120 mgs./ft.$^2$ (1292 mgs./m.$^2$) of silver (1.6 microns) and about 80 mgs./ft.$^2$ (861 mgs./m.$^2$) of gelatin. It can be seen that the black image dye material absorbs generally evenly across the visible spectrum.

EXAMPLE X

A film unit according to the invention was prepared wherein the negative element comprised a transparent subcoated polyester photographic film base having the following layers coated thereon in succession:

1. a polymeric image receiving layer containing about 300 mgs./ft.$^2$ (3229 mgs./m.$^2$) of (a) 3 parts of a mixture of 2 parts polyvinyl alcohol and 1 part poly-4-vinylpyridine and (b) 1 part of a graft copolymer comprised of 4-vinylpyridine (4VP) and vinyl benzyl trimethyl ammonium chloride (TMQ) grafted onto hydroxyethyl cellulose (HEC) at a ratio of HEC/4VP/TMQ of 2.2/2.2/1 and about 5 mgs./ft.$^2$ (54 mgs./m.$^2$) of 1, 4-butanediol diglycidyl ether;

2. a release layer made up of about 30 mgs./ft.$^2$ (323 mgs./m.$^2$) of hydroxyethyl cellulose and about 30 mgs./ft.$^2$ (323 mgs./m.$^2$) of polyethylene wax;

3. a layer comprising about 30 mgs./ft.$^2$ (323 mgs./m.$^2$) of gelatin and about 15 mgs./ft.$^2$ (161 mgs./m.$^2$) of carbon black;

4. a pan sensitive silver iodobromide emulsion layer coated at a coverage of about 125 mgs./ft.$^2$ (1345 mgs./m.$^2$) of silver (1.6 microns) and about 100 mgs./ft.$^2$ (1076 mgs./m.$^2$) of gelatin; and 5. a top coat layer comprising about 30 mgs./ft.$^2$ (323 mgs./m.$^2$) of gelatin and about 2.5 mgs./ft.$^2$ (27 mgs./m.$^2$) of succindialdehyde.

A second element was prepared having a transparent subcoated polyester photographic film base on which there was coated a dye layer made up of about 150 mgs./ft.$^2$ (1614 mgs./m.$^2$) of Compound I and about 100 mgs./ft.$^2$ (1076 mgs./m.$^2$) of gelatin.

The film unit was processed with a processing composition comprised of

|  | WEIGHT PERCENT |
| --- | --- |
| Potassium hydroxide | 5.0 |
| Phenylmercaptotetrazole | 0.1 |
| Phenidone | 0.4 |
| Zinc nitrate | 3.0 |
| Sodium thiosulfate | 0.1 |
| Carboxymethyl hydroxyethyl cellulose | 3.0 |
| Water to make 100% | |

The negative was exposed to a test exposure scale with white light (2 meter-candle-seconds) and passed, together with the second element, through a pair of rollers at a gap spacing of about 0.0024 inch. The film unit was kept intact in the dark for 5 minutes and then stripped apart at the release layer. A high resolution positive transparency image was obtained in the image receiving layer. The transmission densities to red, green and blue light were read on a transmission densitometer. The results are shown below.

|  | R | G | B |
| --- | --- | --- | --- |
| Dmax | 0.93 | 1.01 | 0.96 |
| Dmin | 0.03 | 0.03 | 0.05 |

Figure 2:
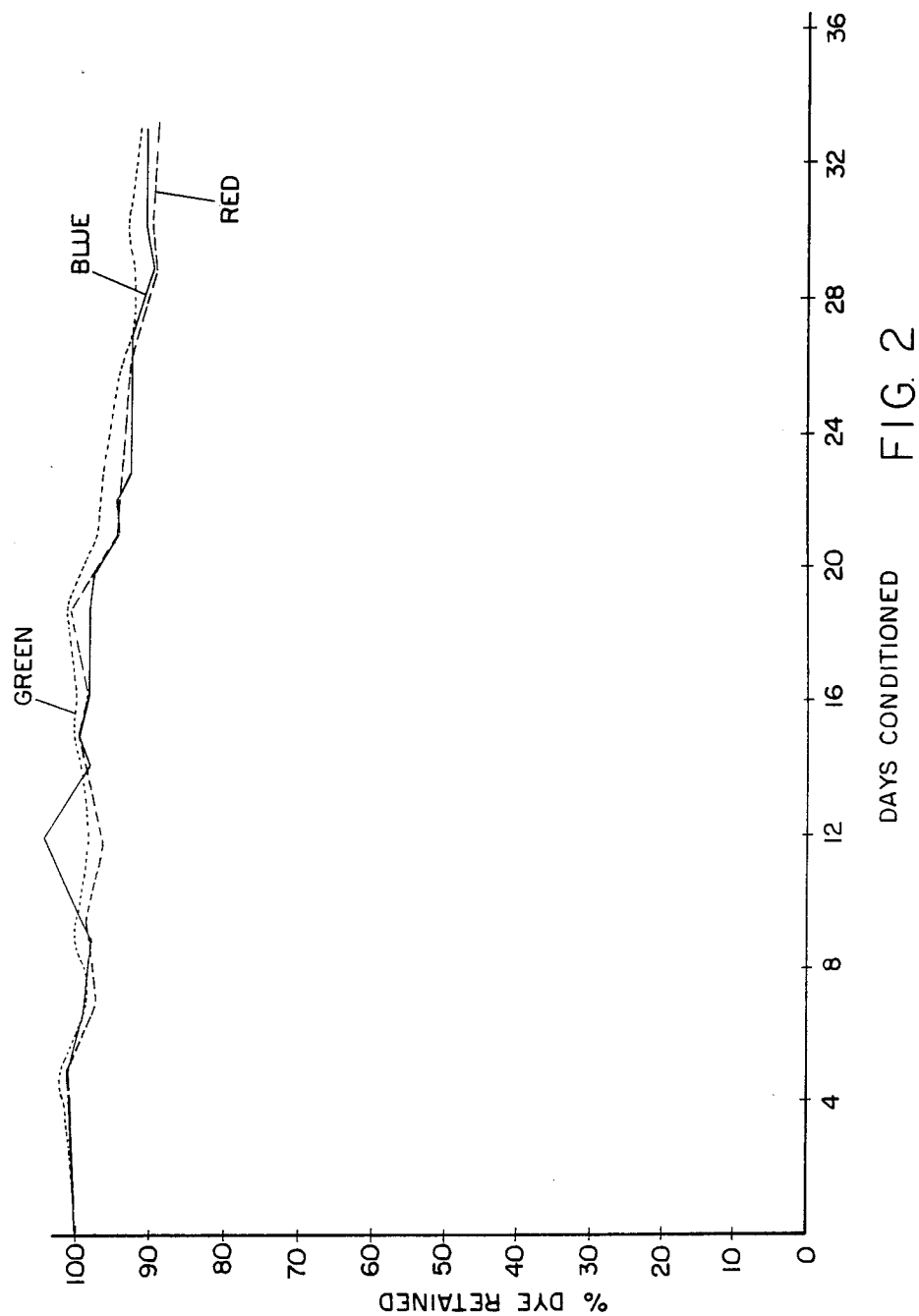
FIG. 2 graphically illustrates light stability data obtained for a transparency formed in Example X.

Another transparency was made in the same manner described above with the exception that the processing composition included 0.2% of phenylmercaptotetrazole and did not include any sodium thiosulfate and the film unit was processed without any light exposure. The image receiving element was then used to determine the dye stability by exposing it, from the image receiving layer side, to the conditions of a Xenon Arc Weatherometer over a period of 33 days. The transparency was periodically removed from the weatherometer and the optical density to red, green and blue, respectively, measured on a densitometer. FIG. 2 graphically illustrates the data obtained as percent dye retained (as a function of optical density) for red, green and blue light. It can be seen that the image dye providing material exhibits excellent light stability. Further it is also evident that the slight fading which did occur is generally similar for the red, green and blue light measurements thus illustrating that the material fades evenly across the visible spectrum.

EXAMPLE XI

A film unit according to the invention was prepared wherein the negative element comprised a transparent subcoated polyethylene terephthalate photographic film base having the following layers coated thereon in succession:

1. a dye developer layer comprising about 78 mgs./ft.$^2$ (840 mgs./m.$^2$) of Compound V and 50 mgs./ft.$^2$ (538 mgs./m.$^2$) of cellulose acetate hydrogen phthalate;
2. a blue sensitive silver iodobromide emulsion layer coated at a coverage of about 200 mgs./ft.$^2$ (2153 mgs./m.$^2$) of silver (1.6 microns) and about 100 mgs./ft.$^2$ (1076 mgs./m.$^2$) of gelatin; and
3. a layer containing about 30 mgs./ft.$^2$ of gelatin (323 mgs./m.$^2$) of gelatin, about 7.5 mgs./ft.$^2$ (81 mgs./m.$^2$) of 4'-methyl phenyl hydroquinone and about 2.5 mgs./ft.$^2$ (27 mgs./m.$^2$) of succindialdehyde.

The same image receiving element and processing composition described in Example IX were used.

The film unit was processed in the same manner described in Example IX. A well developed image was obtained. A Dmax=1.46 and Dmin=0.60 were obtained with a reflection densitometer using green light.

Although the invention has been described in detail with respect to various preferred embodiments thereof, these are intended to be illustrative only and not limiting but rather those skilled in the art will recognize that modifications and variations may be made which are within the spirit of the invention and the scope of the appended claims.

What is claimed is:

1. A photosensitive element comprising a support, a silver halide emulsion in a layer carried by said support, and an image dye-providing material in a layer carried by said support on the same side thereof as said silver halide emulsion, said image dye-providing material being capable of providing an image dye containing the chromophoric system represented by the formula

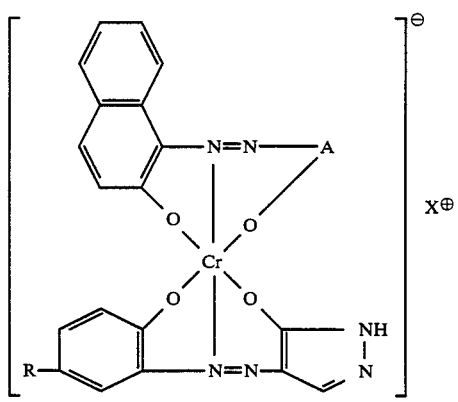

wherein A is

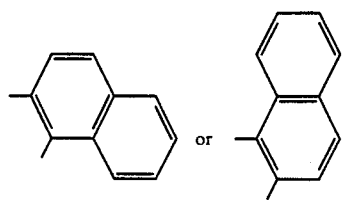

R is hydrogen, —NO$_2$, —SO$_3$H or —SO$_2$NR$_1$R$_2$; R$_1$ and R$_2$ are the same or different and each is hydrogen, alkyl, substituted alkyl, aryl or substituted aryl; and X is a cation.

2. A photosensitive element comprising a support, a silver halide emulsion in a layer carried by said support, and an image dye-providing material in a layer carried by said support on the same side thereof as said silver halide emulsion, said image dye-providing material being capable of providing an image dye containing the chromophoric systemf represented by the formula

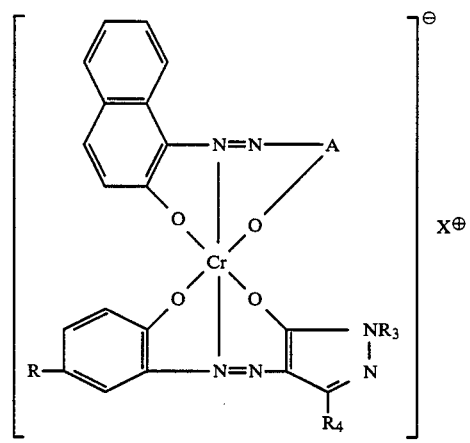

wherein A is

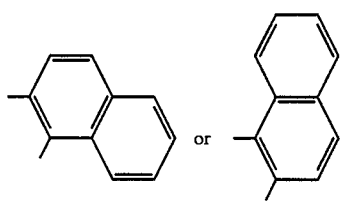

R is hydrogen —NO$_2$, —SO$_3$H or —SO$_2$NR$_1$R$_2$; R$_1$ and R$_2$ are the same or different and each is hydrogen, alkyl, substituted alkyl, aryl or substituted aryl; R$_3$ and R$_4$ are the same or different and each is hydrogen, alkyl, substituted alkyl, aryl or substituted aryl; and X is a cation.

3. A photosensitive element comprising a support, a silver halide emulsion in a layer carried by said support, and an image dye-providing material in a layer carried by said support on the same side thereof as said silver halide emulsion, wherein said image dye providing material is a compound represented by the formula

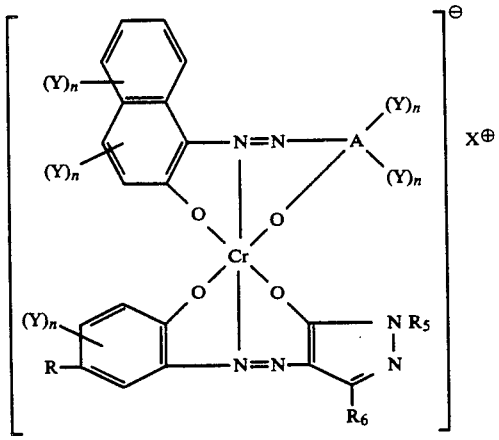

wherein A is

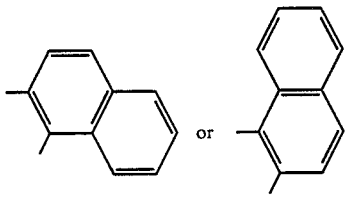

R is hydrogen —NO₂, —SO₃H or —SO₂NR₁R₂; R₁ and R₂ are the same or different and each is hydrogen, alkyl, substituted alkyl, aryl or substituted aryl; R₅ and R₆ are the same or different and each is hydrogen, alkyl, substituted alkyl, aryl, substituted aryl or $(Y)_n$, Y is a substituent including at least one diffusion control moiety, n is 0 or 1, provided that at least one n is 1; and X is a cation.

4. A photosensitive element as defined in claim 3 wherein said diffusion control moiety is selected from the group consisting of a hydroquinonyl silver halide developing moiety, a coupling phenol or naphthol moiety having an available coupling position para to the hydroxyl group, a sulfonamidophenol group which will cleave or ring close following oxidation and a thiazolidine group which is capable of silver-catalyzed cleavage.

5. A photosensitive element as defined in claim 1 wherein R is —NO₂.

6. A photosensitive element comprising a support, a silver halide emulsion in a layer carried by said support, and an image dye-providing material in a layer carried by said support on the same side thereof as said silver halide emulsion, said image dye providing material being represented by the formula

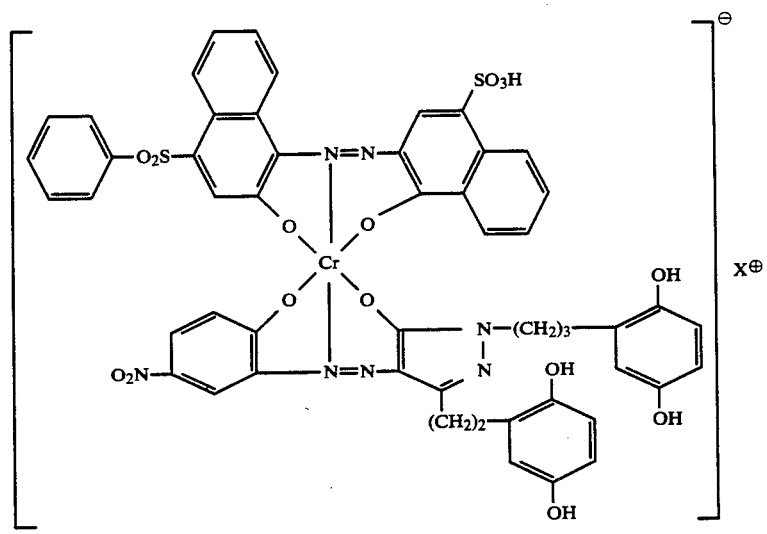

where X is a cation.

7. A diffusion transfer film unit comprising
(a) a photosensitive element as defined in claim 1;
(b) a second sheet-like element adapted to be superposed on said photosensitive element prior to during or after photoexposure;
(c) an image receiving layer positioned in one of said photosensitive or second sheet-like element; and
(d) a rupturable container releasably holding an aqueous alkaline processing composition and so positioned as to be adapted to distribute said processing composition between predetermined layers of said elements.

8. A diffusion transfer film unit comprising
(a) a photosensitive element comprising a support, a silver halide emulsion in a layer carried by said support, and an image dye-providing material in a layer carried by said support on the same side thereof as said silver halide emulsion, said image dye-providing material being capable of providing an image dye containing the chromophoric system represented by the formula

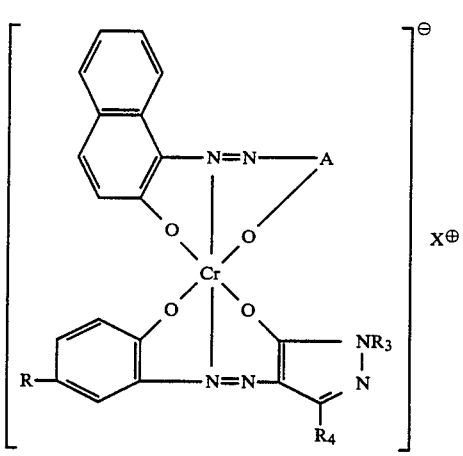

wherein A is

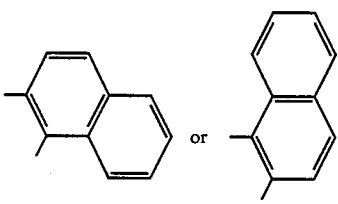

R is hydrogen —NO$_2$, —SO$_3$H or —SO$_2$NR$_1$R$_2$; R$_1$ and R$_2$ are the same or different and each is hydrogen, alkyl, substituted alkyl, aryl or substituted aryl; R$_3$ and R$_4$ are the same or different and each is hydrogen, alkyl, substituted alkyl, aryl or substituted aryl; and X is a cation;

(b) a second sheet-like element adapted to be superposed on said photosensitive element prior to, during or after photoexposure;

(c) an image receiving layer positioned in one of said photosensitive or second sheet-like elements; and (d) a rupturable container releasably holding an aqueous alkaline processing composition and so positioned as to be adapted to distribute said processing composition between predetermined layers of said elements.

9. A diffusion transfer film unit comprising (a) a photosensitive element comprising a support, a silver halide emulsion in a layer carried by said support, and an image dye-providing material in a layer carried by said support on the same side thereof as said silver halide emulsion, wherein said image dye-providing material is a compound represented by the formula

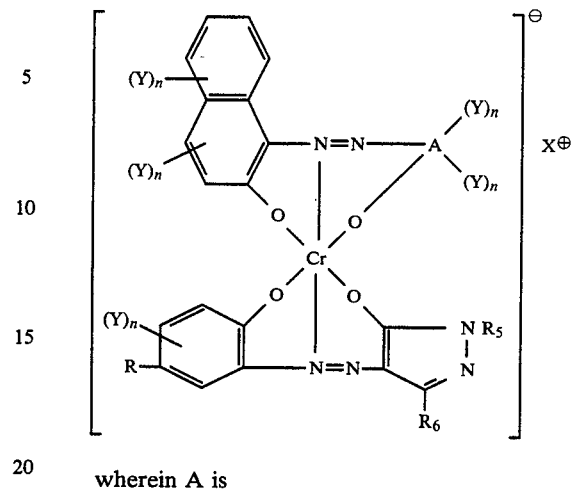

wherein A is

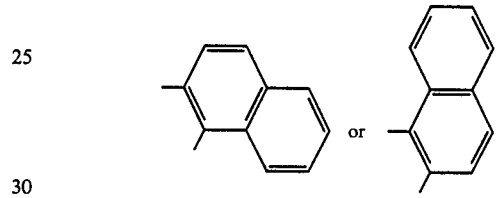

R is hydrogen —NO$_2$, —SO$_3$H or —SO$_2$NR$_1$R$_2$; R$_1$ and R$_2$ are the same or different and each is hydrogen, alkyl, substituted alkyl, aryl or substituted aryl; R$_5$ and R$_6$ are the same or different and each is hydrogen, alkyl, substituted alkyl, aryl, substituted aryl or (Y)$_n$, Y is a substituent including at least one diffusion control moiety, n is 0 or 1, provided that at least one n is 1; and X is a cation;

(b) a second sheet-like element adapted to be superposed on said photosensitive element prior to, during or after photoexposure;

(c) an image receiving layer positioned in one of said photosensitive or second sheet-like elements; and (d) a rupturable container releasably holding an aqueous alkaline processing composition and so positioned as to be adapted to distribute said processing composition between predetermined layers of said elements.

10. A diffusion transfer film unit as defined in claim 9 wherein said diffusion control moiety is selected from the group consisting of a hydroquinonyl silver halide developing moiety, a coupling phenol or naphthol moiety having an available coupling position para to the hydroxyl group, a sulfonamidophenol group which will cleave or ring close following oxidation and a thiazolidine group which is capable of silver-catalyzed cleavage.

11. A diffusion transfer film unit as defined in claim 7 wherein R is —NO$_2$.

12. A diffusion transfer film unit comprising (a) a photosensitive element comprising a support, a silver halide emulsion in a layer carried by said support and an image dye-providing material in a layer carried by said support on the same side thereof as said silver halide emulsion, said image dye-providing material being represented by the formula

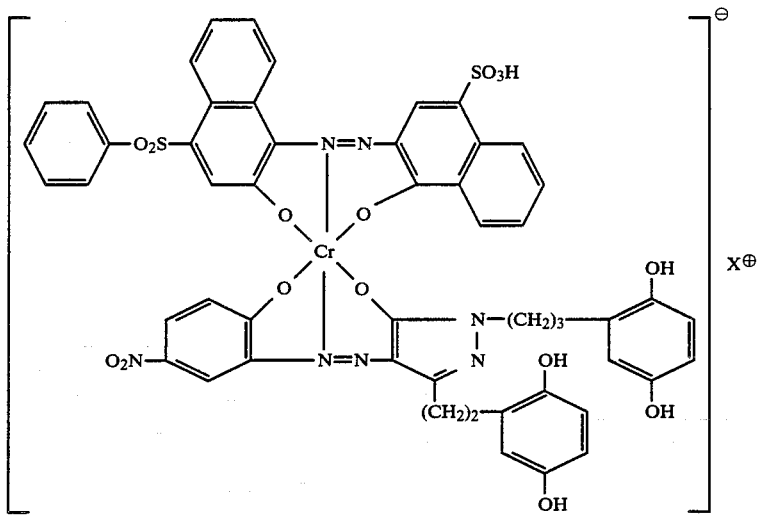

where X is a cation;

(b) a second sheet-like element adapted to be superposed on said photosensitive element prior to, during or after photoexposure;

(c) an image receiving layer positioned in one of said photosensitive or second sheet-like elements; and (d) a rupturable container releasably holding an aqueous alkaline processing composition and so positioned as to be adapted to distribute said processing composition between predetermined layers of said elements.

13. A diffusion transfer process comprising (a) imagewise exposing a photosensitive element including a silver halide emulsion and an image dye-providing material containing at least one diffusion control moiety which is capable of providing a diffusion image dye containing the chromophoric system represented by the formula

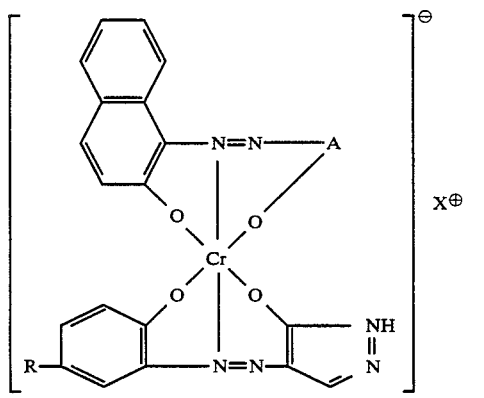

wherein A is

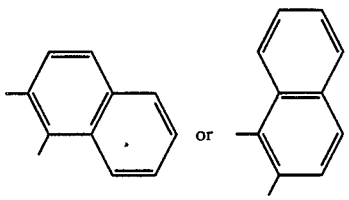

R is hydrogen —NO₂, —SO₃H or —SO₂NR₁R₂; R₁ and R₂ are the same or different and each is hydrogen, alkyl, substituted alkyl, aryl or substituted aryl; and X is a a cation;

(b) developing said exposed photosensitive element with an aqueous alkaline processing composition;

(c) forming an imagewise distribution of said diffusible image dye from said image dye-providing material as a function of development; and (d) transferring at least a portion of said imagewise distribution of said diffusible image dye to an image receiving layer arranged in superposed relationship with said silver halide emulsion to provide a diffusion transfer dye image.

14. A diffusion transfer process comprising (a) imagewise exposing a photosensitive element including a silver halide emulsion and an image dye-providing material containing at least one diffusion control moiety which is capable of providing a diffusible image dye containing the chromophoric system represented by the formula

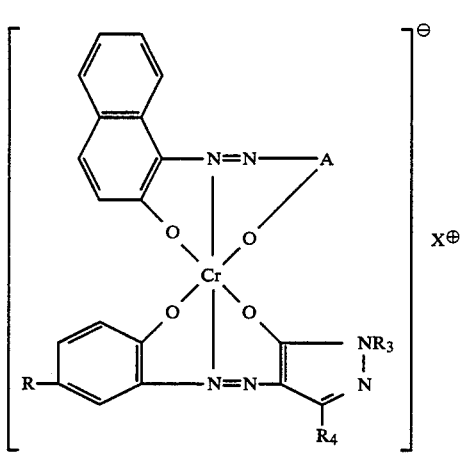

wherein A is

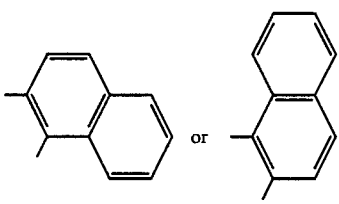

R is hydrogen —NO₂, —SO₃H or —SO₂NR₁R₂; R₁ and R₂ are the same or different and each is hydrogen, alkyl, substituted alkyl, aryl or substituted aryl; R₃ and R₄ are the same or different and each is hydrogen, alkyl, substituted alkyl, aryl, or substituted aryl; and X is a cation;

(b) developing said exposed photosensitive element with an aqueous alkaline processing composition;

(c) forming an imagewise distribution of said diffusible image dye from said image dye-providing material as a function of development; and (d) transferring at least a portion of said imagewise distribution of said diffusible image dye to an image receiving layer arranged in superposed relationship with said silver halide emulsion to provide a diffusion transfer dye image.

15. A diffusion transfer process comprising (a) imagewise exposing a photosensitive element including a silver halide emulsion and an image dye-providing material represented by the formula

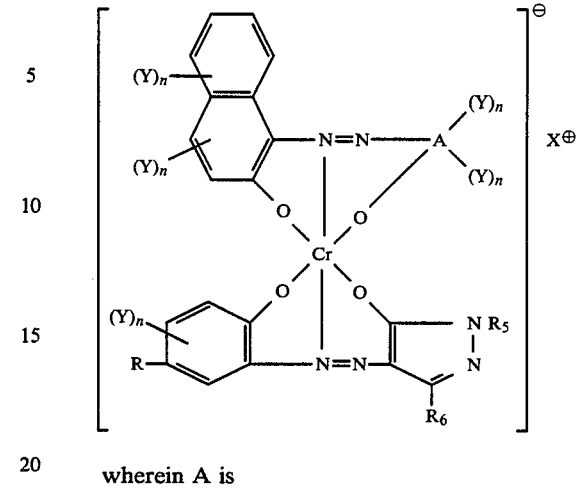

wherein A is

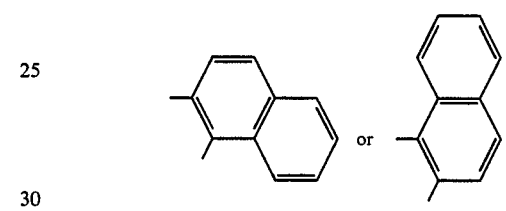

R is hydrogen —NO₂, —SO₃H or —SO₂NR₁R₂; R₁ and R₂ are the same or different and each is hydrogen, alkyl, substituted alkyl, aryl or substituted aryl; R₅ and R₆ are the same or different and each is hydrogen, alkyl, substituted alkyl, aryl, substituted aryl or (Y)ₙ, Y is a substituent including at least one diffusion control moiety, n is 0 or 1, provided that at least one n is 1; and X is a cation;

(b) developing said exposed photosensitive element with an aqueous alkaline processing composition;

(c) forming an imagewise distribution of said diffusible image dye from said image dye-providing material as a function of development; and (d) transferring at least a portion of said imagewise distribution of said diffusible image dye to an image receiving layer arranged in superposed relationship with said silver halide emulsion to provide a diffusion transfer dye image.

16. A diffusion transfer process as defined in claim 15 wherein said diffusion control moiety is selected from the group consisting of a hydroquinonyl silver halide developing moiety, a coupling phenol or naphthol moiety having an available coupling position para to the hydroxyl group, a sulfonamidophenol group which will cleave or ring close following oxidation and a thiazolidine group which is capable of silver-catalyzed cleavage.

17. A diffusion transfer process as defined in claim 13 wherein R is —NO₂.

* * * * *